(12) United States Patent
Kandappan et al.

(10) Patent No.: US 10,346,221 B2
(45) Date of Patent: *Jul. 9, 2019

(54) DETERMINING LIFE-CYCLE OF TASK FLOW PERFORMANCE FOR TELECOMMUNICATION SERVICE ORDER

(71) Applicant: AT&T Intellectual Property I, L.P., Atlanta, GA (US)

(72) Inventors: Arun Kandappan, Morganville, NJ (US); Joseph Schutte, Freemansburg, PA (US); Mark Welch, McKinny, TX (US); Kevin White, Waukesha, WI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/583,639

(22) Filed: May 1, 2017

(65) Prior Publication Data

US 2017/0235597 A1    Aug. 17, 2017

Related U.S. Application Data

(63) Continuation of application No. 14/798,116, filed on Jul. 13, 2015, now Pat. No. 9,639,394.

(51) Int. Cl.
*G06F 3/00* (2006.01)
*G06F 9/54* (2006.01)
*G06Q 10/06* (2012.01)

(52) U.S. Cl.
CPC ....... *G06F 9/54* (2013.01); *G06Q 10/063114* (2013.01)

(58) Field of Classification Search
CPC .................................... G06F 9/54; G06F 9/48
USPC ................................. 719/310; 718/100, 310
See application file for complete search history.

(56) References Cited

U.S. PATENT DOCUMENTS

| 5,920,846 A | 7/1999 | Storch et al. |
|---|---|---|
| 6,349,238 B1 | 2/2002 | Gabbita et al. |
| 6,832,199 B1 | 12/2004 | Kucek et al. |
| 6,937,993 B1 | 8/2005 | Gabbita et al. |

(Continued)

FOREIGN PATENT DOCUMENTS

| AU | 2015201957 A1 | 5/2015 |
|---|---|---|
| CA | 2539179 C | 4/2005 |

OTHER PUBLICATIONS

Steven D. Eppinger, A Model-Based Method for Organizing Tasks in Product Development (Year: 1994).*

(Continued)

*Primary Examiner* — Lechi Truong

(57) ABSTRACT

A method includes a processor for determining a life cycle of a first performance of a task flow for a telecommunication service order, determining that a performance of a first task within the first performance of the task flow has exceeded a threshold processing time, and determining that there is a problem with a first centralized system component in response to determining that the performance of the first task within the first performance of the task flow has exceeded the threshold processing time. The method may further include identifying the centralized system component for servicing when it is determined that there is a problem with the centralized system component.

20 Claims, 5 Drawing Sheets

(56) References Cited

U.S. PATENT DOCUMENTS

| | | | |
|---|---|---|---|
| 6,965,806 | B2 | 11/2005 | Eryurek et al. |
| 7,167,550 | B2 | 1/2007 | Klos et al. |
| 7,624,024 | B2 | 11/2009 | Levis et al. |
| 7,647,391 | B1 | 1/2010 | Jean et al. |
| 7,653,611 | B2 | 1/2010 | Zheng et al. |
| 7,853,467 | B2 | 12/2010 | Aboujaoude et al. |
| 7,881,945 | B2 | 2/2011 | Schmitt et al. |
| 8,069,070 | B2 | 11/2011 | Papili et al. |
| 8,429,088 | B2 | 4/2013 | Kaplan et al. |
| 8,612,276 | B1 | 12/2013 | Nielsen et al. |
| 8,775,225 | B2 | 7/2014 | Lopez |
| 8,804,941 | B2 | 8/2014 | Werth et al. |
| 8,862,184 | B2 | 10/2014 | Barbosa et al. |
| 8,868,660 | B2 | 10/2014 | Hastings et al. |
| 2003/0187824 | A1* | 10/2003 | MacInnis ............... G06F 9/3861 |
| 2006/0248147 | A1 | 11/2006 | Hill et al. |
| 2007/0179829 | A1 | 8/2007 | Laperi et al. |
| 2008/0243902 | A1* | 10/2008 | Rong ..................... G06Q 10/06 |
| 2009/0055520 | A1* | 2/2009 | Tabata .................. G06F 1/3221 |
| | | | 709/223 |
| 2009/0239480 | A1* | 9/2009 | Rofougaran ...... H04L 12/40013 |
| | | | 455/73 |
| 2009/0240554 | A1 | 9/2009 | Oswald et al. |
| 2009/0319572 | A1 | 12/2009 | Bernard |
| 2010/0241884 | A1* | 9/2010 | Barsness ............... G06F 1/3203 |
| | | | 713/322 |
| 2011/0179371 | A1* | 7/2011 | Kopycinski ........... G06Q 10/10 |
| | | | 715/772 |
| 2014/0297374 | A1* | 10/2014 | Ikezawa ........... G06Q 10/06395 |
| | | | 705/7.41 |
| 2015/0066782 | A1 | 3/2015 | Vainberg et al. |

OTHER PUBLICATIONS

Yavelberg, I. S. "Human performance engineering considerations for very large computer-based systems: The end user." Bell System Technical Journal, The 61.5 (1982): 765-797. Disclosing performance based on experience accrued by telephone company loop operations personnel and specifically the Bell System Service Representative.

Hoecker, Douglas G. "Activity Sampling Applied to Interactive System Design." Proceedings of the Human Factors and Ergonomics Society Annual Meeting. vol. 25. No. 1. SAGE Publications, 1981. http://pro.sagepub.com/content/25/1/462.short.

Tesfay, Welderufael B., et al. "Mobile computing application for industrial field service engineering: A case for ABB service engineers." Local Computer Networks Workshops (LCN Workshops), 2013 IEEE 38th Conference on. IEEE, 2013. https://pure.ltu.se/portal/files/47953180/p188_tesfay.pdf Disclosing how industrial field service benefits from information and communication technology from the availability of on-site information to improve process support by providing tailored service from service engineers (Figure 1; p. 190).

Campbell, John D., and James Reyes-Picknell. "Strategies for excellence in Maintenance management." Productivity Prsee Portland, Oregon pp. 185(1995). http://faculty.kfupm.edu.sa/ARE/amhammad/ARE-524-course-web/Uptime-3-Planning-and-Scheduling-Resources.pdf Disclosing a power-point presentation outlining maintenance team supported by systems for designing management operations ("Work order management" on p. 14).

Zimmermann, Olaf, Pal Krogdahl, and Clive Gee. "Elements of service-oriented analysis and design." IBM developerworks (2004). http://wsdl2code.googlecode.com/svn/trunk/06-CD/02-Literatur/Zimmermann%20et%20al.%202004.pdf Disclosing a hybrid Service Order Ananlysis & Design method for structuring field operations (Figures 2-6; pp. 4-10).

Arsanjani, Ali. "Service-oriented modeling and architecture." IBM developer works (2004): 1-15. http://immagic.com/eLibrary/ARCHIVES/GENERAL/IBM/I041109A.pdf Discloses implementing findings of service-order analysis, generally by rebuilding current operations to improve workflow (pp. 7-11 and 12 for subsystem analysis).

Kahina Bessai, Bi-criteria workflow tasks allocation and scheduling in Cloud computing environments, 2012.

\* cited by examiner

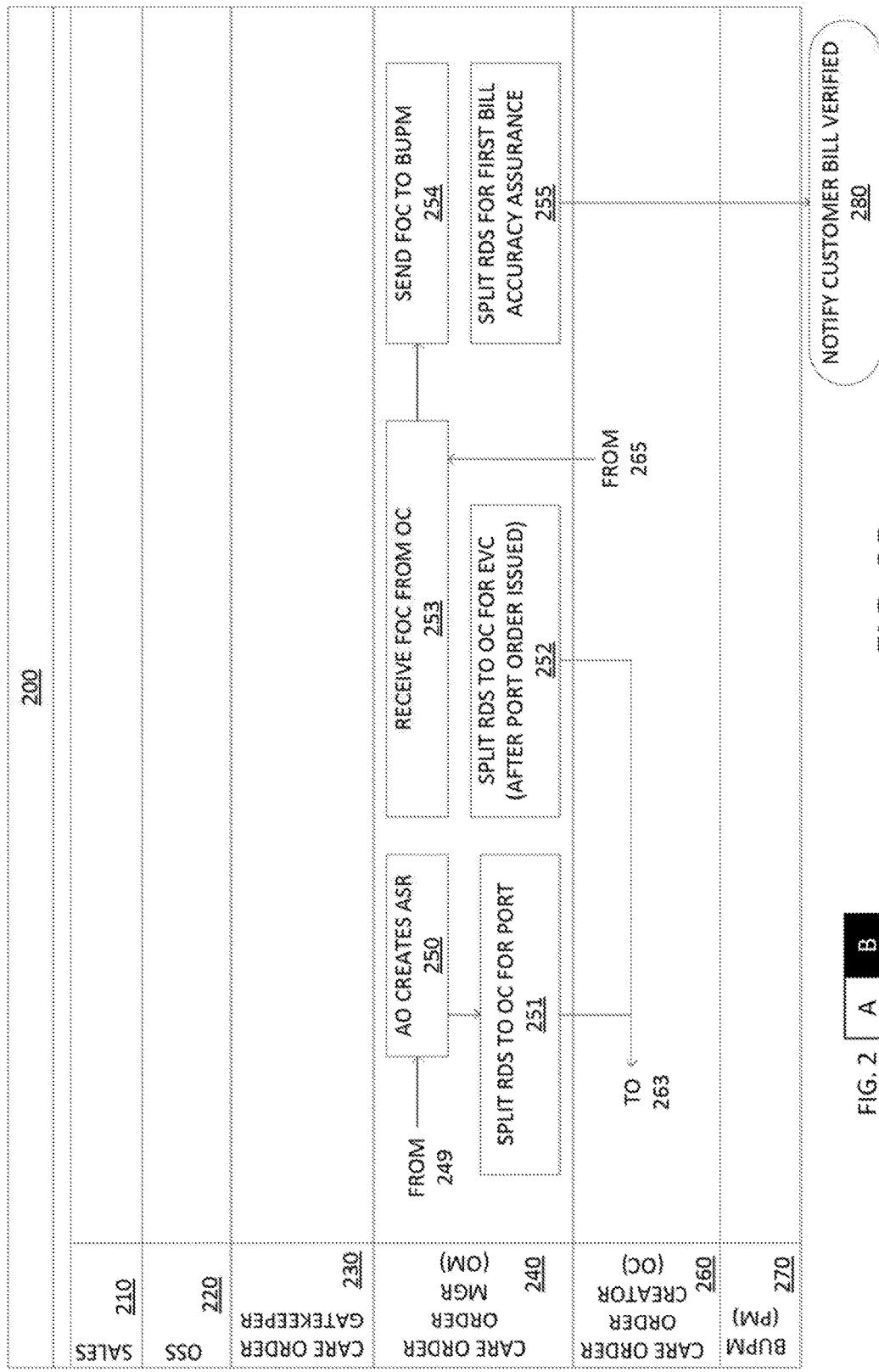

DETERMINING LIFE-CYCLE OF TASK FLOW PERFORMANCE FOR TELECOMMUNICATION SERVICE ORDER

This application is a continuation of U.S. patent application Ser. No. 14/798,116, filed Jul. 13, 2015, now U.S. Pat. No. 9,639,394, which is herein incorporated by reference in its entirety.

The present disclosure relates generally to customer service troubleshooting and, more particularly, to associating records of tasks observed on agent devices and records of system component usage with a task flow.

BACKGROUND

Various types of organizations provide customer service agents for handling a variety of customer-facing issues. For example, a network service provider may staff a call center with customer service agents for handling issues relating to billing, service disruption, adding and removing features from service plans, endpoint device troubleshooting, and so forth. In some cases, customers may contact the organization by telephone at a call center. In other cases, an organization may provide customer service agents that are available for network-based chat conversations, e.g., instant messages, text messages, emails, and so forth.

SUMMARY

In one example, the present disclosure provides a method, computer-readable medium, and device for determining a life cycle of a performance of a task flow for a telecommunication service order. For example, a method may include a processor determining a life cycle of a first performance of a task flow for a telecommunication service order, determining that a performance of a first task within the first performance of the task flow has exceeded a threshold processing time, and determining that there is a problem with a first centralized system component in response to determining that the performance of the first task within the first performance of the task flow has exceeded the threshold processing time. The method may further include the processor identifying the centralized system component for servicing when it is determined that there is a problem with the centralized system component.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
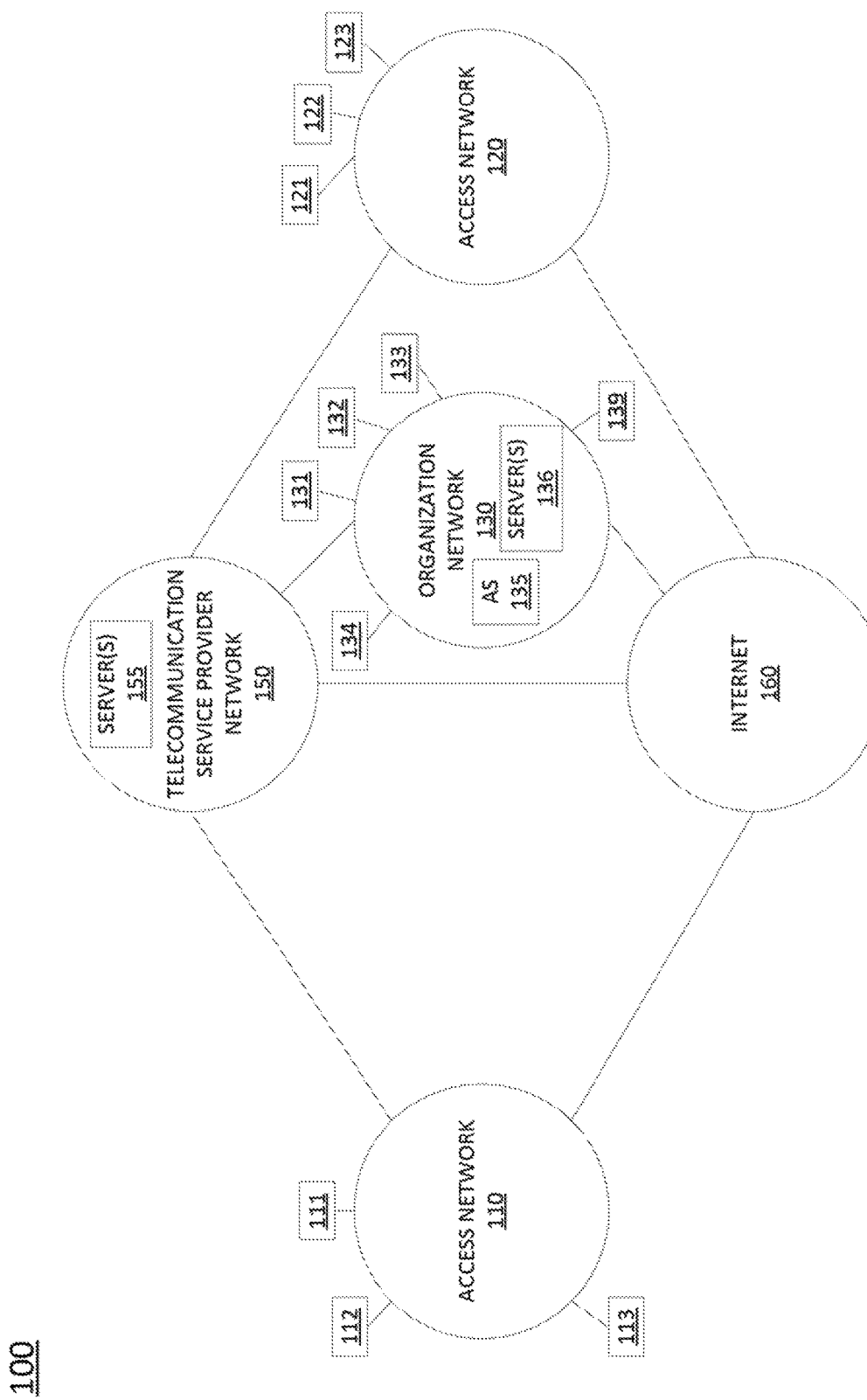
FIG. 1 illustrates one example of a system for customer service interactions, according to the present disclosure.

The present disclosure broadly discloses methods, non-transitory (i.e., tangible or physical) computer-readable storage media, and devices for determining a life cycle of a performance of a task flow for a telecommunication service order. For example, in one aspect the present disclosure relates to tracking of task flows for processing telecommunication service orders from customers or subscribers.

In one example the present disclosure includes one or more agents' computers for gathering data pertaining to task flow processing, one or more centralized system components for gathering additional data pertaining to task flow processing, and a server for correlating the data pertaining to the task flow processing from the agents' computers and from the centralized system components. In accordance with the present disclosure, customer service orders for telecommunication services are processed via a number of defined task flows associated with a number of different order types. In other words, when a customer contacts the organization with a new telecommunication service order, the order type is identified and a task flow corresponding to the order type is triggered. In one example, the task flow includes a series of defined steps, or tasks, that one or more agents are to follow in order to process and complete the service order. A task flow may also include tasks that invoke a number of different centralized system components and may involve tasks that are performed by a number of different agents.

In one example, each agent's computer may track which centralized system components are accessed by the agent, and how the agent interacts with each of the centralized system components. For example, a first agent may receive an order, determine an order type, select a task flow corresponding to the order type, and begin performing several tasks related to the task flow. For instance, the first agent may field a phone call from a new customer and determine that the customer would like to place an order for a new Internet and telephone package (e.g., a double-play service). The first agent may select a task flow for processing a new double-play service order, and may then take the customer's basic information such as the name, address, and so forth, according to the relevant task flow. For instance, taking the customer's basic information may comprise the performance of one or more tasks in the task flow. According to the task flow, the first agent may then pass processing of the order to a second agent, e.g., a technician, to perform one or more other tasks, such as provisioning a new telephone number. According to the task flow, the first agent or the second agent may then schedule a field technician to visit the address in order to check the cabling and to install or configure a router and other equipment, and so forth.

In order to provide an end-to-end view of the performance of the task flow, the first agent's computer may gather usage data pertaining to the processing of the task flow, and the performance of tasks within the task flow. The usage data may include: the time (e.g., broadly the elapsed time duration that was measured) that a particular application (e.g., a particular software application) is first opened or accessed, the duration of time that the application remains open or active on the first agent's computer, the time that the application is closed, one or more interactions with the application during the time the application is active, such as commands entered by the first agent, the time required in order for various information to be entered into one or more data entry fields of a XML form, or the like, or the time that such a form is submitted to a centralized system component, buttons clicked by the first agent to select a file or select a particular command, and so forth.

To illustrate, the first agent's computer may track and record that the first agent opened and utilized a particular application screen, or application window, to enter the customer's basic information, and may record one or more instances of time or time periods (e.g., time stamps) associated with the usage of the particular application and/or the associated application screen. In one example, the first agent's computer may gather usage data via a separate application that may track the usage of other applications associated with the performance and processing of task flows. In addition, a similar application running on the second agent's computer may determine that at one or more instances of time or over the course of one or more time periods, the second agent has used yet another application to access a database on a centralized system component to determine a telephone number that is free to be assigned to the new customer. Thereafter, the first agent's computer may determine that at a later time, the first agent is using the same or a different application screen to request scheduling for a field technician to visit the address.

In the above example, both the first agent's computer and the second agent's computer may send usage data that are gathered pertaining to the task flow to a centralized server. In turn, the server may correlate this usage data to determine that the activities of the first agent and second agent relate to tasks that are all part of the same task flow associated with the same customer order. Thus, the server may determine how long (broadly a time duration) each of the tasks of the task flow may have taken to complete, notwithstanding that two or more agents were involved in various aspects of the task flow.

In addition, by gathering usage data regarding which applications are used and which application windows are active, the centralized server may more accurately determine how much time the agents spent actively working on the respective tasks. To illustrate, an agent may be handling several service orders simultaneously, and may be performing different tasks related to each service order. The agent may, for instance, be working on a task for a first task flow associated with a first customer telecommunication service order, and may be interrupted by a call from a customer involving a second service order. The agent may then perform one or more tasks of a second task flow associated with the second service order. For example, the agent may take basic information from the customer regarding the customer's name, address, the nature of the call, and so forth. The agent may also select the second task flow based upon a type of order as determined from the information related by the calling customer. After finishing the call with the customer, the agent may then return to performing the task for the first task flow.

If the duration of time to complete the task of the first task flow is calculated based upon simply the start time and the finish time, the result would also include the time spent by the agent working on one or more tasks of the second task flow. However, the agent's computer may record usage data that indicates that an application screen associated with the task of the first task flow was not active for a period of time, but that one or more other application screens associated with one or more tasks of the second task flow were active during such period of time. In this case, the centralized server is able to attribute to the task of the first task flow, the actual time spent by the agent with the corresponding application window in active mode. Similarly, the agent may not complete a task of the second task flow after finishing the call with the customer in order to return to and complete processing of the task of the first task flow. Thereafter, the agent may then continue with the task of the second task flow. In this case, the centralized server may also attribute to the task of the second task flow the time spent when a corresponding application window was active, while excluding the time where the usage data from the agent's computer indicates that an application window associated with the task of the first task flow was active.

In addition to the foregoing, centralized system components that are accessed by the one or more agents in connection with the task flow may also record usage data regarding agents' interactions with the respective centralized system components. For example, a centralized system component may record via time stamps as to when and how each agent interacts with the centralized system component, e.g., whether the interaction is a request to create, retrieve, access, or write to a particular file, the time of the interaction, and so forth. For instance, a first centralized system component may record that the first agent has submitted basic customer information associated with the new customer at a first time. A second centralized system component may record that the second agent has requested to access a current version of an assigned telephone numbers database at a second time, and so forth. Thus, the centralized server is able to correlate usage data from multiple agents' computers and from multiple centralized system components to track the end-to-end processing of a task flow and to determine how much time is spent on each task in the task flow.

From this information, bottlenecks of particular tasks in the task flow may be identified. For example, the longest duration task for the task flow may be determined and identified as a potential task for revision, in order to improve overall processing times for the particular order type. In another example, deviations from normal processing times for a performance of the task flow, and for performance of tasks within the performance task flow may be identified. For example, if the task flow on average requires one hour to complete, and a particular performance of the task flow takes two hours to complete, the cause of the deviation may need to be investigated. For instance, a marketing promotion may have resulted in a significant number of orders of a particular order type beyond a normal number of orders per day. Thus, if it is determined that the cause of the deviation is only temporary, it may be decided that the task flow should not be revised because the temporary condition will likely pass. On the other hand, it may be determined that agents should be reassigned to provide more staff to handle the surge in the order type related to the task flow for which the normal processing time has been exceeded. In another example, it may be observed that whereas two supervisors are typically assigned to process orders of a particular order type, one of the supervisors may have become unavailable resulting in a bottle-neck of a particular task in a task flow that requires a supervisor to review and check-off prior to a front-line agent continuing to process the order.

In still another example, it may be determined that a delay at particular task in the task flow is affecting a large number of agents over the course of various performances of the task flow for various service orders, or that only a small number of agents having significant delays are causing the average time to complete the particular task to be skewed. If the latter is determined, then it may be necessary to investigate whether a particular issue is affecting the small number of agents. For example, it may be determined that the task flow for the order type was recently revised to eliminate some tasks and to streamline the task flow, but that a handful of agents are continuing to perform the tasks that were eliminated, causing a preceding or following task in the task flow to be recorded as taking an inordinate amount of time. Thus, the above and similar analyses may be facilitated via the task flow tracking of the present disclosure. In addition, these and other aspects of the present disclosure are discussed in greater detail below in connection with the examples of FIGS. 1-4.

To aid in understanding the present disclosure, FIG. 1 illustrates an example system 100 comprising a plurality of different networks for supporting the determining of a life cycle of a performance of a task flow, e.g., associated with a telecommunication service order and related functions for task flow tracking. Telecommunication service provider network 150 may comprise a core network with components for telephone services, Internet services, and/or television services (e.g., triple-play services, etc.) that are provided to subscribers, and to peer networks. In one example, telecommunication service provider network 150 may combine core network components of a cellular network with components of a triple-play service network. For example, telecommunication service provider network 150 may functionally comprise a fixed mobile convergence (FMC) network, e.g., an IP Multimedia Subsystem (IMS) network. In addition, telecommunication service provider network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication service provider network 150 may also further comprise a broadcast television network, e.g., a traditional cable provider network or an Internet Protocol Television (IPTV) network, as well as an Internet Service Provider (ISP) network. With respect to television service provider functions, telecommunication service provider network 150 may include one or more television servers for the delivery of television content, e.g., a broadcast server, a cable head-end, a video-on-demand (VoD) server, and so forth. For example, telecommunication service provider network 150 may comprise a video super hub office, a video hub office and/or a service office/central office. For ease of illustration, various components of telecommunication service provider network 150 are omitted from FIG. 1.

In one example, access networks 110 and 120 may each comprise a Digital Subscriber Line (DSL) network, a broadband cable access network, a Local Area Network (LAN), a cellular or wireless access network, and the like. For example, access networks 110 and 120 may transmit and receive communications between endpoint devices 111-113, 121-123, and telecommunication service provider network 150 relating to voice telephone calls, communications with web servers via the Internet 160 and/or other networks 130, 140, and so forth. Access networks 110 and 120 may also transmit and receive communications between endpoint devices 111-113, 121-123 and other networks and devices via Internet 160.

For example, one or both of access networks 110 and 120 may comprise an ISP network, such that 111-113 and/or 121-123 may communicate over the Internet 160, without involvement of telecommunication service provider network 150. Endpoint devices 111-113 and 121-123 may each comprise a telephone, e.g., for analog or digital telephony, a mobile device, a cellular smart phone, a laptop, a tablet computer, a desktop computer, a plurality or cluster of such devices, and the like. In one example, any one or more of endpoint devices 111-113 and 121-123 may further comprise software programs, logic or instructions for providing a customer service interaction chat conversation interface in accordance with the present disclosure, e.g., to facilitate interactive telecommunication service orders and other interactive customer service communications between customers and customer service agents of organization network 130, e.g., through text message chats, multimedia chats, interactive forms, and so forth, in addition to landline or cellular telephony or voice communications.

In one example, the access networks 110 and 120 may be different types of access networks. In another example, the access networks 110 and 120 may be the same type of access network. In one example, one or more of the access networks 110 and 120 may be operated by the same or a different service provider from a service provider operating telecommunication service provider network 150. For example, each of access networks 110 and 120 may comprise an Internet service provider (ISP) network, a cable access network, and so forth. In another example, each of access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where telecommunication service provider network 150 may provide mobile core network 130 functions, e.g., of a public land mobile network (PLMN)-universal mobile telecommunications system (UMTS)/General Packet Radio Service (GPRS) core network, or the like. In still another example, access networks 110 and 120 may each comprise a home network, which may include a home gateway, which receives data associated with different types of media, e.g., television, phone, and Internet, and separates these communications for the appropriate devices. For example, data communications, e.g., Internet Protocol (IP) based communications may be sent to and received from a router in one of access networks 110 or 120, which receives data from and sends data to the endpoint devices 111-113 and 121-123, respectively.

In this regard, it should be noted that in some examples, endpoint devices 111-113 and 121-123 may connect to access networks 110 and 120 via one or more intermediate devices, such as a home gateway and router, e.g., where access networks 110 and 120 comprise cellular access networks, ISPs and the like, while in another example, endpoint devices 111-113 and 121-123 may connect directly to access networks 110 and 120, e.g., where access networks 110 and 120 may comprise local area networks (LANs) and/or home networks, and the like.

In one example, organization network 130 may comprise a local area network (LAN), or a distributed network connected through permanent virtual circuits (PVCs), virtual private networks (VPNs), and the like for providing data and voice communications. In one example, organization network 130 links one or more endpoint devices 131-134 and 139 with each other and with Internet 160, telecommunication service provider network 150, devices accessible via such other networks, such as endpoint devices 111-113 and 121-123, and so forth. In one example, endpoint devices 131-134, comprise devices of organizational agents, such as customer service agents, or other employees or representatives who are tasked with addressing customer-facing issues on behalf of the organization that provides organization network 130.

In one example, endpoint device 139 may comprise a device of a manager, or any other type of supervisory employee or agent of the organization. In one example, endpoint devices 131-134 and 139 may each comprise a telephone for analog or digital telephony, a mobile device, a cellular smart phone, a laptop, a tablet computer, a desktop computer, a bank or cluster of such devices, and the like. In one example, any one or more of endpoint devices 131-134 and 139 may comprise software programs, logic or instructions for performing or supporting one or more aspects of determining a life cycle of a performance of a task flow for a telecommunication service order, in accordance with the present disclosure. In addition, any one or more of endpoint devices 131-134 and 139 may comprise software programs, logic or instructions for providing a customer service interaction chat conversation interface for facilitate interactive telecommunication service orders and other interactive customer service communications between customers and customer service agents, e.g., as an alternative or in addition to telephony or voice communications. In this regard, voice calls and interactive chat conversations between customers and organizational agents may be facilitated via one or more of telecommunication service provider network 150 and Internet 160.

In one example, organization network 130 may also include an application server (AS) 135. In one example, AS 135 may comprise a computing system, such as computing system 400 depicted in FIG. 4, and may be configured to provide one or more functions for determining a life cycle of a performance of a task flow for a telecommunication service order, in accordance with the present disclosure. For example, AS 135 may be configured to perform one or more steps, functions, or operations in connection with the example method 300 described below.

In one example, organization network 130 may be associated with the telecommunication service provider network 150. For example, the organization may comprise the telecommunication service provider, where the organization network 130 comprises devices and components to support customer service representatives, and other employees or agents performing customer-facing functions. For instance, endpoint devices 111-113 and 121-123 may comprise devices of customers, who may also be subscribers in this context. In one example, the customers may call via a telephone or engage in text or multi-media based chat conversations via endpoint devices 111-113 and 121-123 with customer service representatives using endpoint devices 131-134.

In one example, the system 100 may include one or more servers 136 and/or one or more servers 155 in organization network 130 and telecommunication service provider network 150 respectively. In one example, the servers 136 and/or 155 may each comprise a computing system, such as computing system 400 depicted in FIG. 4, and may be configured to host one or more centralized system components for supporting the processing of task flows for telecommunication service orders. For example, a first centralized system component may comprise a database of assigned telephone numbers, a second centralized system component may comprise a database of basic customer account information for all or a portion of the customers/subscribers of the telecommunication service provider network 150, a third centralized system component may comprise a cellular network service home location register (HLR), e.g., with current serving base station information of various subscribers, and so forth. Other centralized system components may include a customer relationship management (CRM) system, an inventory system (IS), an order system, the enterprise reporting system (ERS), the account object (AO) database system, and so forth. It should be noted that in one example, a centralized system component may be hosted on a single server, while in another example, a centralized system component may be hosted on multiple servers, e.g., in a distributed manner. Thus, an access of a centralized system component may, in some cases, involve accessing several physical servers.

In examples of the present disclosure, one or more agents using one or more of endpoint devices 131-134 and 139 may therefore access various centralized system components in connection with performing task flow tasks for telecommunication customer service orders. An example of such a task flow and its associated tasks, as well as example centralized system components are described in greater detail below in connection with FIG. 2. In addition, it should be realized that the network 100 may be implemented in a different form than that illustrated in FIG. 1, or may be expanded by including additional endpoint devices, access networks, network elements, application servers, etc. without altering the scope of the present disclosure.

Figure 2A:
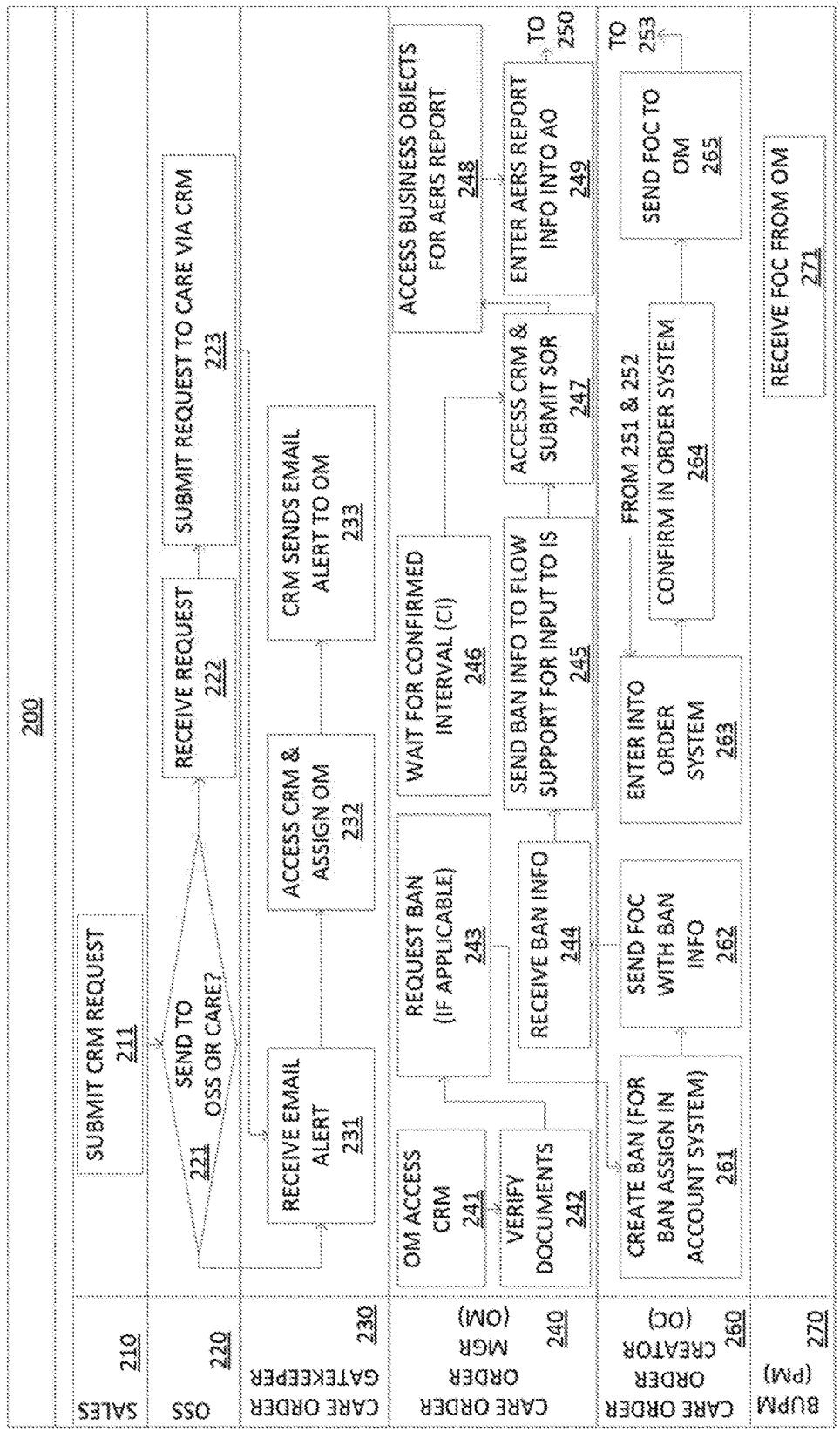
FIG. 2 (collectively FIG. 2A and FIG. 2B) illustrates an example task flow for a telecommunication service order, according to the present disclosure.

To further aid in understanding the present disclosure, FIG. 2 (collectively FIG. 2A and FIG. 2B) illustrates an example task flow 200 for a customer telecommunication service order, in accordance with the present disclosure. Task flow 200 includes a plurality of tasks that are to be performed by a number of agents 210, 220, 230, 240, 260, and 270. Task flow 200 relates to an example order for a switched Ethernet service. The first task is task 211 which is to be performed by a first agent 210, e.g., a sales agent. In task 211, agent 210 submits a request to a customer relationship management (CRM) system. For example, agent 210 may comprise a sales agent who takes an initial inquiry from a subscriber or a potential subscriber and formulates a request for a new switched Ethernet service. The task flow 200 then proceeds to task 221 where the request is forwarded to ordering sales support (OSS) unit, which may comprise one or more agents, including agent 220. Task 221 may comprise agent 220 determining whether to further process the inquiry within the OSS unit, or to forward the inquiry to an order gatekeeper, e.g., agent 230.

If the inquiry is to be further processed within the OSS unit, the task flow 200 proceeds to task 222 where the request is received, e.g., by agent 220, or a different agent within the OSS unit. For example, the agent 220 may decide to review the request for various reasons, such as when the agent 210 lacks sufficient technical experience to complete the order or is unsure about certain technical aspects of the order. At task 223, the agent 220 submits the request to the order gatekeeper, agent 230.

At task 231, agent 230 receives an email alert of the new request. At task 232, agent 230 accesses the CRM system and assigns an order manager (OM), e.g., agent 240. At task 233, agent 230 causes the CRM system to send an email alert to agent 240, informing agent 240 that he or she has been assigned as the order manager for the request.

At task 241, agent 240 accesses the CRM system. Agent 240 verifies documents at task 242. At task 243, agent 240 may request a billing account number (BAN), if one does not already exist for the customer requesting the new switched Ethernet service. At task 261, an order creator (OC), e.g., agent 260, receives a request for a new BAN, creates a BAN for the customer, and assigns the BAN to the customer in an account system. In one example, agent 260 is associated with a local carrier serving the location of the customer. In this regard, the local carrier may be integrated with or partnered with the organization receiving the customer telecommunication service order, or may comprise a separate and/or unrelated company that may have a partnership or agreement with the organization receiving the customer telecommunication service order to share information and coordinate provisioning of infrastructure and services for customers.

At task 262, agent 260 sends a firm order commitment (FOC) with the BAN information. At task 244, agent 240 receives the BAN information. At task 245, agent 240 enters the BAN information into an inventory system (IS). At task 246, agent 240 waits for a confirmed interval (CI) before commencing task 247. In one example, the CI is determined from the FOC sent by agent 260 at task 262. The CI may correspond to a time period or particular date or time after which the local telecommunication company guarantees that infrastructure to reach the customer site will be ready for the switched Ethernet service. For example, the local telecommunication company may have an existing facility to the customer site which may simply be activated, or may have no existing facility such that a new one will need to be installed.

At task 247, agent 240 accesses the CRM system and submits a sales order request (SOR). For example, the customer request for the switched Ethernet service may be made "official" by submission of the SOR. At task 248, agent 240 accesses a business objects interface for retrieving an enterprise reporting system (ERS) report from the ERS. At task 249, agent 240 enters information from the ERS report into an account object (AO) database system. For example, the AO database system creates a link between the customer and the central office. At task 250, agent 240 creates an access service record (ASR) in the AO database system. At tasks 251 and 252, agent 240 splits the SOR for the order creator (OC), agent 260. For example, at task 251, agent 240 splits the SOR to the OC for obtaining a port. For instance, in order to connect the customer router a port needs to be assigned. At task 252, agent 240 may split the SOR to the OC for obtaining an Ethernet virtual circuit.

At task 263, agent 260 enters the port request and the Ethernet virtual circuit request into an order system of the local telecommunications company. At task 264, agent 260 confirms the port request and the Ethernet virtual circuit request in the order system. At task 265, agent 260 sends a firm order commitment (FOC) to agent 240. For example, the FOC may provide a time period or particular date or time after which the local telecommunication company guarantees that the customer site will be ready to activate the switched Ethernet service.

At task 253, agent 240 receives the FOC from agent 260. At task 254, agent 240 sends the FOC to a business unit process manager. At task 271, agent 270, e.g., the business unit process manager, receives the FOC. At task 255, agent 240 splits the SOR for first bill accuracy assurance, performs a verification process, and notifies to the customer that the first bill has been verified at task 280.

It should be noted that agents access various centralized system components in connection with the performance of task flow 200, such as the CRM system, inventory system (IS), the local telecommunication company order system, the enterprise reporting system (ERS), the account object (AO) database system, and so forth. In accordance with the present disclosure, usage data may be collected from the agents' devices, as well as from the centralized system components in order to determine a life cycle of the performance of the task flow 200. In addition, various metrics may be derived from the life cycle of the performance of the task flow 200, such as identifying tasks which take longer than average, task that are recurring bottlenecks, agents that take longer than average to complete one or more tasks, and so forth. For example, by determining and tracking the life cycles of one or more performances of task flow 200, it may be determined that tasks 246, 248, and 263 are particular bottlenecks. For instance, task 246 requires agent 240 to wait for a confirmed interval (CI). This is an undefined period of time that depends on site readiness. Thus, the remainder of the task flow following step 246 is held up while waiting for task 246 to complete. In another example, task 248 may require agent 240 to retrieve an ERS report, but the ERS may be configured such that the system is only accessible to pull reports for a 20 minute window every hour. Thus, if agent 240 just misses the end of one window, the agent 240 may need to wait up to 40 minutes to retrieve the ERS report during the next open window. In another example, task 263 may involve agent 260 clearing errors in the SOR. If there are errors, agent 260 may correct the errors and contact agent 240 to resubmit the SOR. Thus, if the SOR includes many errors, this may cause agent 260 to take a relatively longer time to complete task 263 as compared to as if there were no errors or fewer errors in the SOR. Thus, these and other conclusions may be derived from the life cycle of the performance of the task flow 200. In addition, it should be noted that the task flow 200 of FIG. 2 illustrates just one example of one particular type of a customer telecommunication service order. Thus, other customer telecommunication service order types may follow various task flows, and may involve the same or different agents accessing various centralized system components.

Figure 3:
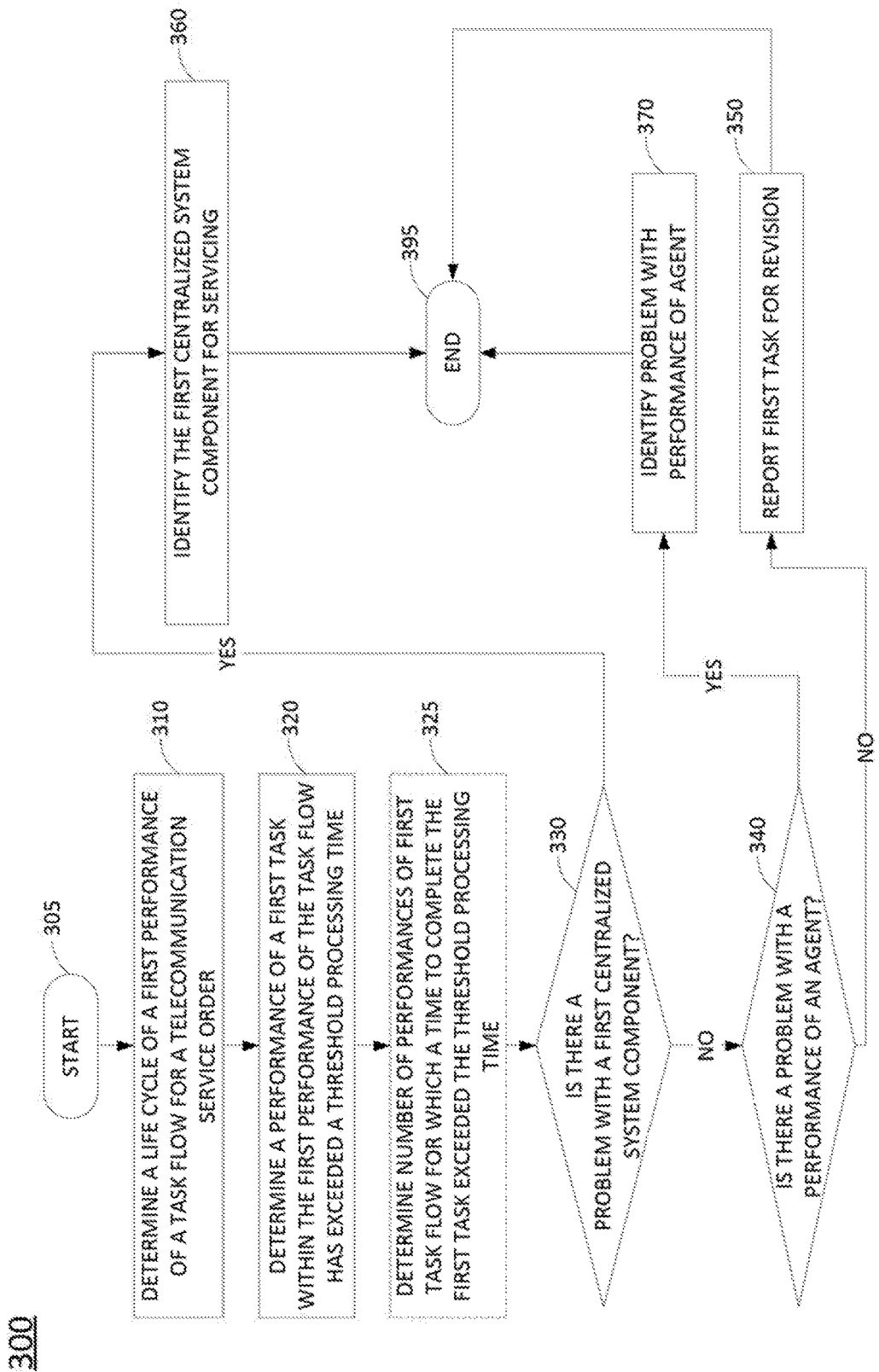
FIG. 3 illustrates an example flowchart of a method for determining a life cycle of a performance of a task flow for a telecommunication service order.

FIG. 3 illustrates an example flowchart of a method 300 for determining a life cycle of a performance of a task flow for a telecommunication service order. In one example, the steps, operations, or functions of the method 300 may be performed by any one or more of the components of the system 100 depicted in FIG. 1. For instance, in one example, the method 300 is performed by the application server 135. Alternatively, or in addition, one or more steps, operations or functions of the method 300 may be implemented by a computing device having a processor, a memory and input/output devices as illustrated below in FIG. 4, specifically programmed to perform the steps, functions and/or operations of the method. Although any one of the elements in system 100 may be configured to perform various steps, operations or functions of the method 300, the method will now be described in terms of an example where steps or operations of the method are performed by a processor, such as processor 402 in FIG. 4.

The method 300 begins at step 305 and proceeds to step 310. At step 310, the processor determines a life cycle of a first performance of a task flow for a telecommunication service order. In one example, the life cycle of the first performance of the task flow comprises one or more of: a duration of time to complete the first performance of the task flow, a duration of time to complete each of one or more tasks in the task flow, and an identity of an agent performing each of the one or more tasks in the task flow. In one example, the determining the life cycle of the first performance of the task flow comprises determining a first duration of time for a completion of the performance of a first task. The first duration of time for the completion of the performance of the first task may be determined based upon usage data received from a device of a first agent, e.g., the agent responsible for performing the first task.

For instance, the first agent's computer or terminal may gather usage data pertaining to the processing and performance of the first task flow, and tasks within the first task flow. The usage data may include an identification of one or more software applications that are utilized. For each application, the usage data may also include time stamps for: the time that the particular application is first opened or accessed, the time that the application is closed, the time that information is entered into one or more data entry fields of an electronic form, or the like, or the time that such a form is submitted. The usage data may alternatively or additionally include: the duration of time that the application screen remains open or active on the first agent's computer, one or more interactions with the application during the time the application is active, such as commands being entered by the first agent, buttons clicked by the first agent to select a file or select a particular command, and so forth.

To illustrate, the first agent's computer may track that the first agent opened and utilized a particular application screen to enter a customer's basic information. In one example, a separate application on the first agent's computer may track the usage of other applications associated with the performance and processing of one or more tasks of one or more task flows. In any case, the first agent's computer may forward the usage data to the processor, which may be received by the processor as part of step 310. In one example, the processor may query or prompt the device of the first agent to forward the usage data. In another example, the device of the first agent may send the usage data on its own initiative, e.g., as usage data is collected, periodically, according to a hybrid scheme, or according to another scheme.

In one example, the determining the life cycle of the first performance of the task flow may also include determining a second duration of time for completion of a second task within the first performance of the first task flow. For example, the duration of time for completion of the performance of the second task may be determined based upon data received from a device of a second agent, e.g., the agent responsible for performing the second task. For instance, the second agent's computer may gather usage data of the same or a similar nature to that described above in connection with the usage data gathered by the device of the first agent.

In one example, the first duration of time for completion of the performance of the first task is further determined based upon usage data received from a first centralized system component. For instance, the processor may correlate a first time stamp indicating the invocation of the first application and the identification of the first application from the usage data from the device of the first agent with an access of the first centralized system component. Similarly, in one example, the duration of time for completion of the performance of the second task may be further based upon usage data received from a second centralized system component. For example, centralized system components that are accessed by agents in connection with performing various tasks of various task flows may also record usage data regarding agents' interactions with the respective centralized system components. For example, a centralized system component may record and time stamp when and how each agent interacts with the centralized system component, e.g., whether the interaction is a request to create, retrieve, access, or write to a particular file, the time of the interaction, and so forth. To illustrate, in the present example the first centralized system component may record that the first agent has submitted basic customer information associated with the new customer at a first time. Similarly, a second centralized system component may record that the second agent has requested to access a current version of an assigned telephone numbers database at a second time, and so forth. Thus, in one example, at step 310, the processor correlates usage data from one or more agents' devices and from one or more centralized system components to determine how long is spent on each task in the task flow.

For example, the first agent may have a first application screen active at a particular time. The first agent may also be multi-tasking several customer service orders. If the first agent were only working on a single customer service order, it may be relatively easy for the processor, based upon the usage data, to determine which task in the task flow for the single customer service order the first agents usage of the first application relates to. For instance, the application may have the sole purpose of entering customer basic information into an electronic form for submission to a database system (e.g., a centralized system component). In addition, the task flow may only include one task where basic customer information is to be entered by an agent. Thus, when the first agent has the first application active, the usage data may clearly be attributed to the task for entering basic customer information. On the other hand, when the first agent is multi-tasking several customer service orders, two or more task flows associated with the several customer service orders may include tasks for entering basic customer information. Thus, it may not be clear, based solely upon the usage data from the first agent's computer to which task of which task flow the usage of the application relates.

For instance, the first agent could be entering basic customer information for a first customer during performance of a task of the first task flow, or the first agent could be entering basic customer information for a second customer during performance of a task of a second task flow. However, when the processor receives additional usage information from a centralized system component, the processor may then be able to resolve the ambiguity with the additional usage information. For example, the centralized system component may comprise a database system for storing basic customer information. In addition, the additional usage information may indicate that the first agent's interaction with the database system involved the creation of a new customer record, as opposed to the modification of an existing record. Thus, the processor may determine that usage data from the first agent's computer regarding the duration of time the first application window was active on the first agent's computer relates to a task in the first task flow, based upon the additional usage data from the database system indicating that the first agent created a new record at the same time the first application window was active.

In addition, although the first agent may be assigned to handle tasks relating to tasks flows for multiple customer service orders, the processor may further differentiate between time the first agent spends on a task for the first task flow and time the first agent spends on a task for the second task flow by tracking progress through the respective task flows. For instance, if the first task flow and second task flow both include tasks for entering basic customer information and the first agent is responsible for both tasks, the processor may determine that when the first task flow has progressed to tasks beyond the entering of the basic customer service information, that any time spent by the first agent at a later time utilizing an application screen for entering basic customer information instead relates to a task of the second task flow. In other words, the processor may anticipate that a particular application is to be invoked based upon a current task in the task flow. For example, the processor may track that the performance of the first task flow has progressed to a particular task, and that the next task in the task flow calls for the first agent to open a particular application. Thus, when the processor determines that the application has been opened, e.g., based upon the usage data from the agent's device, based upon usage data from a centralized system component, etc., the processor may determine that the associated task has been commenced.

In one example, a second centralized system component may comprise a second database system comprising a database file of assigned telephone numbers. Accordingly, in one example, the second agent may utilize an application on the second agent's computer to access the database file from the second database system to determine whether a particular telephone number requested by a customer is free/available, or whether the requested number is already assigned and therefore unavailable. As such, the usage data from the second database system may comprise a record of the time the second agent accessed the database file of assigned telephone numbers, the time the second agent checked-in the database file, a time that the second agent updated the database file, e.g., to mark the requested telephone number as having been assigned, and so forth. Thus, as part of step 310, the processor may receive this additional usage data from the second database system, which may be correlated with usage data from the device of the second agent, in order to more accurately attribute the duration of time spent by the second agent working on one or more tasks.

In addition, by tracking the duration of time to complete one or more tasks in the first task flow by the one or more agents, the processor is also able to track the end-to-end processing of a task flow. For example, the determining the duration of time to complete the first performance of the first task flow may be based upon the first duration of time for the completion of the performance of the first task. In one example, if a second task is performed as part of the task flow, the duration of time to complete the first performance of the first task flow may be further based upon the second duration of time for the completion of the performance of the second task, and so forth for additional tasks of the first task flow. For example, the duration of time to complete the first performance of the first task flow may comprise at least the sum of the duration of time to complete the first task and the duration of time to complete the second task.

At step 320, the processor determines that a duration of time to complete the first task has exceeded a threshold processing time. For example, the threshold processing time may comprise an average time for an agent to complete the first task. The average time to complete the first task may be measured over a number of previous hours, days, weeks, or over any other period of time. In another example, the threshold processing time may comprise the average duration of time to complete the first task plus some additional amount of time, e.g., an additional 10 percent, an additional 20 percent, an additional 10 minutes, an additional 20 minutes, an additional two standard deviations, and so forth. As described above in connection with step 310, in one example, the duration of time to complete the first task may be determined by the processor based upon a duration of time that an application associated with the first task remains active on a device of a first agent assigned to perform the first task. Thus, for instance, the first agent may begin a task prior to a scheduled lunch break. The task may remain unfinished when the lunch break begins, and the first agent may return to complete the first task after the lunch break. Accordingly, the duration of time to complete the first task may not include the time in which the first agent was on lunch break, as determined from the application and/or the device of the first agent being inactive during this time, and as indicated in the usage data that may be received by the processor at step 310 from the device of the first agent.

In still another example, the threshold duration of time may be a duration that exceeds the duration of time to process one or more additional tasks of the task flow. For example, the processor may determine that for the first performance of the first task flow, the performance of the first task has taken the longest time to complete as compared to other tasks in the task flow. In another example, step 320 may comprise the processor determining that the first task is one of several tasks taking the longest time to complete as compared to other tasks, during the first performance of the first task flow, e.g., one of the top three longest duration tasks, one of the top five longest duration tasks, etc.

At optional step 325, the processor determines a number of performances of the first task flow for which a time to complete the first task exceeded a threshold processing time. For example, as mentioned above, the threshold processing time may comprise an average time for an agent to complete the first task. The average time to complete the first task may be measured over a number of previous hours, days, weeks, or over any other period of time. In another example, the threshold processing time may comprise the average duration of time to complete the first task plus some additional amount of time, e.g., an additional 10 percent, an additional 20 percent, an additional 10 minutes, an additional 20 minutes, an additional two standard deviations, and so forth. In one example, the processor may determine a number of performances of the first task flow for which a time to complete the first task exceeded a threshold processing time based upon usage data relating to a plurality of completed or in-progress performances of the first task flow.

At step 330, the processor determines whether there is a problem with a first centralized system component, e.g., in response to determining that the performance of the first task within the first performance of the task flow has exceeded the threshold processing time. In one example, the processor determines that there is a problem with the first centralized system component when the duration of time for the performance of the first task has exceeded the threshold processing time for at least a threshold number of performances of the first task by different agents in connection with a number of different performances of the first task flow. In other words, where many agents are exceeding the threshold processing time for the first task, e.g., on a given day, or during a given time period within a day, the processor may determine that there is a problem with a centralized system component, as opposed to a particular agent or agents having trouble performing the first task. For example, a performance of the first task may involve an agent accessing a database file from the first centralized system component. However, the centralized system component may be suffering from delays. For example, a network-based server hosting the first centralized system component may have lost power, or may be in the process of rebooting, causing a number of agents to be unable to perform the first task (or a different task that similarly requires access to the same centralized system component) in connection with various task flows. In another example, an agent, a supervisor, or another person within the organization may have mistakenly modified the centralized system component such that the database file is only read and/or write accessible to supervisors or others with enhanced access rights, thereby denying access to the database file to the first agent and other agents. In any case, when the processor determines that there is a problem with the first centralized system component, the method 300 then proceeds to step 360. Otherwise the method 300 proceeds to step 340. It should be noted that there may be widespread delays observed with respect to the first task without the existence a corresponding problem with a centralized system component. For example, the first task may not require that an agent access any centralized system components. Thus, even if there are widespread delays, if the processor determines that the first task does not require any centralized system component access, the method 300 may proceed to step 340.

At step 360, the processor identifies the first centralized system component for servicing. For example, the processor may send a message to one or more supervisory personnel, one or more technicians responsible for the upkeep of a network-based server hosting the centralized system component, and so forth. In one example, the processor may provide alerts to one or more agents who may be assigned to perform tasks that call for accessing the centralized system component. Thus, the agents may be informed of the problem and will be prepared for some delay. In addition, the agents will understand that supervisors or other responsible parties within the organization have already been made aware of the problem, and the agents will therefore refrain from sending redundant and potentially time-wasting additional notifications to responsible parties. Following step 360, the method 300 proceeds to step 395 where the method ends.

At step 340, the processor determines whether there is a problem with the performance of the first agent. For example, at step 330 the processor may calculate whether a delay in the performance of the first task is affecting a large number of agents, thereby indicating that the problem is not with the agents, but with a centralized system component. However, where the delay in performing the first task is affecting a lesser number of agents, or only the first agent, the processor may determine that there is a problem that is affecting only those agents for which the processing time in completing the first task has exceeded the threshold. For example, the first agent and possibly one or more additional agents may have recently returned from vacation. However, while the first agent was away on vacation, the first task flow may have been revised to eliminate several tasks. In addition, agents of the organization may have received a memorandum or attended a meeting to learn of the change to the first task flow. Without the benefit of this information, the first agent may continue to perform the now extraneous tasks, which may cause a preceding and/or a following task of the first task flow to be recorded as having taken an excessive amount of time to complete. Thus, at step 340, the processor may determine that there is a performance problem that is specific to a group of agents including the first agent, or that is specific to the first agent based upon whether exceeding the processing time for performance of the first task is widespread or more limited. For example, when the duration of time for the performance of the first task has exceeded a threshold processing time for less than a threshold number of performances of the first task, e.g., over the course of several hours, over the course of a day, etc., the processor may conclude that the problem is specific to a small group of agents and/or specific to the first agent. The threshold processing time referenced at step 340 may be the same or a different threshold processing time that that which is utilized at steps 320 and/or 325. When there is a problem with the performance of the first agent, the method 300 then proceeds to step 370. Otherwise the method 300 proceeds to step 350.

At step 350, the processor reports the first task for revision. For example, it may be determined that there are no problems with any centralized system components, but that processing delays in performing the first task are widespread over performances of the first task flow by a sufficiently large number or percentage of different agents. Thus, it may be determined that the first task is a particular bottleneck of the first task flow. For example, the first task may take an average of 1.5 hours to complete whereas the entire first task flow may include 20 tasks and take 2 hours to complete, on average. Thus, a 20 percent improvement to the average processing time of the first task would have a greater impact that a 20 percent improvement in the processing time of one of the other 19 tasks of the first task flow. As mentioned above, in one example, step 320 may comprise the processor determining that the first task has taken the longest time to complete, or is one of several tasks for taking the longest periods of time to complete, as compared to other tasks in the first performance of the first task flow. The processor may collect usage data from various agent devices and from various centralized system components to determine that the first task is a bottleneck based upon the first task taking longer to complete, on average, than other tasks in the first task flow. In addition, the determination may be based upon usage information gather with respect to a plurality of performances of the first task flow.

Following step 350, the method 300 proceeds to step 395 where the method ends.

As described above, when it is determined at step 340 that there is a problem with the performance of an agent, the method 300 then proceeds to step 370. At step 370, the processor identifies a training issue or staffing issue, and identifies at least the first agent for training, or for relief/support. In one example, the processor may further distinguish between a problem that identifies a training issue with respect to the first agent and a problem that relates to an improper staffing level of agents processing the first task flow. For example, the first task flow may have been recently revised to eliminate some tasks and to streamline the task flow. However, the processor may determine that one or more agents, including the first agent, are continuing to perform the tasks that were eliminated, causing a preceding or following step in the task flow to be recorded as taking an inordinate amount of time, e.g., beyond a threshold duration of time. Thus, at step 370, the processor may send a notification to a supervisor identifying the first agent, and/or identifying the first task that has taken an excessive amount of time for the first agent to complete, and recommending the first agent for training. In one example, the processor may also identify other agents that are similarly affected. In one example, the processor may include additional information, such as the average duration of time for an agent to complete the first task, a time when the task flow and/or the first task was last revised, along with the nature of the revision, information regarding whether the first agent has exceeded the threshold duration of time to complete the first task only recently, e.g., within the last day or the last week, or whether the first agent has been exceeding the threshold for performing the first task over a longer period of time, e.g., for several weeks.

In another example, the processor may determine that the first task requires a certain type of agent to perform, e.g., a supervisor or technician, and that the organization is currently understaffed with such agents. For example, the organization may typically have two supervisors on duty at all times, but one of the supervisors may have had to leave unexpectedly, leaving only a single supervisor to perform the workload typically handled by two. In one example, the processor may therefore obtain additional data regarding agents on duty from one or more other centralized system components that are not directly related to the processing of task flows. For example, a human resources/employee management server may track when agents may check-in and check-out of work, e.g., by recording when agents log-in and-log out of their computers, recording when agents electronic identification badges are presented to gain entry to the building or work unit, and so forth. When the processor determines from the usage data that the first task is taking the first agent (e.g., the supervisor left alone on duty) an excessive time to finish, the processor may alert a responsible party, such as the supervisor's supervisor, to recommend a staffing adjustment. For example, one of the front-line agents may be temporarily reassigned to handle supervisory duties until a second actual supervisor is available. Thus, although there may be ramifications from having one less front-line agent, the total throughput of customer service orders by the organization may increase because the bottleneck at the first task may be alleviated.

Following step 370, the method 300 proceeds to step 395 where the method ends.

In addition, although not specifically specified, one or more steps, functions or operations of the method 300 may include a storing, displaying and/or outputting step as required for a particular application. In other words, any data, records, fields, and/or intermediate results discussed in the method 300 can be stored, displayed and/or outputted either on the device executing the method 300, or to another device, as required for a particular application.

Furthermore, steps, blocks, functions, or operations in FIG. 3 that recite a determining operation or involve a decision do not necessarily require that both branches of the determining operation be practiced. In other words, one of the branches of the determining operation can be deemed as an optional step. In addition, one or more steps, blocks, functions, or operations of the above described method 300 may comprise optional steps, or can be combined, separated, and/or performed in a different order from that described above, without departing from the examples of the present disclosure.

As such, the present disclosure provides at least one advancement in the technical field of customer telecommunication service order systems. This advancement is in addition to the traditional methods of performing time and motion studies where a human consultant shadows a number of organization agents over a number of workdays, recording the tasks each agent performs, the duration of time to complete each task, and any number of qualitative observations. In particular, the present disclosure includes the determination of a life cycle of a performance of a task flow, e.g., providing an end-to-end view of the performance of the task flow. In one example, the determination of the life cycle of the performance of a task flow includes correlating usage data from one or more agent devices with usage data from one or more centralized system components. In one example, the determination of the life cycle of the performance of a task flow includes tracking the times at which a particular application is active on the device of an agent in order to determine when the agent is actually and actively working on a particular task, as opposed to simply tracking when a task is begun and completed. This enables a more accurate determination of how much time agents spend actively working on the respective tasks. Bottlenecks of particular tasks in the task flow may also be identified and resolved in an improved manner. In addition, the present disclosure provide for efficient and improved determination of whether delays in task processing are a result of problems with centralized system components, problems with a particular agent or agents, or a staffing problem. This leads to more efficient telecommunication customer service order processing, greater customer satisfaction, and better and more efficient use of human resources within an organization.

The present disclosure also provides a transformation of data, e.g., usage data is generated by one or more agent devices and one or more centralized system components. The usage data is gathered, stored, correlated, and analyzed, and is transformed into additional data or new data that: characterizes whether or not a performance of a task has exceeded a threshold processing time, identifies a centralized system component as having a problem and being in need of servicing, identifies an agent or agents in need of training, and so forth.

Finally, examples of the present disclosure improve the functioning of a computing device, e.g., a server. Namely, a server for tracking the processing of task flows is improved by the use of usage data from devices of agents and from centralized system components, including usage data that tracks the times at which a particular application is active on the device of an agent in order to determine when the agent is actually and actively working on a particular task, as opposed to simply tracking when a task is begun and completed, thereby providing a server that is more efficiently able to determine how much time agents spend actively working on the respective tasks, to identify bottlenecks of particular tasks in the task flow, and to differentiate between whether delays in task processing are a result of problems with centralized system components, problems with a particular agent or agents, or a staffing problem.

Figure 4:
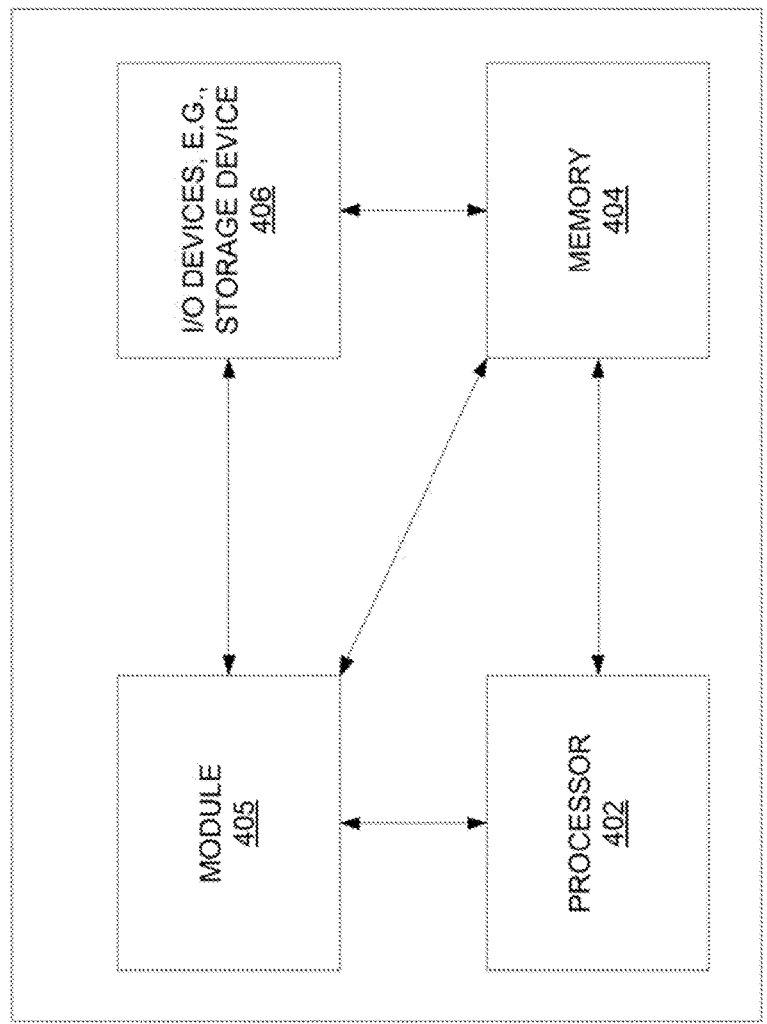
FIG. 4 illustrates a high-level block diagram of a computing device specially programmed for use in performing the functions described herein.

FIG. 4 depicts a high-level block diagram of a computing device suitable for use in performing the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for determining a life cycle of a performance of a task flow for a telecommunication service order, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 300 as discussed above is implemented in a distributed or parallel manner for a particular illustrative example, i.e., the steps of the method, or the entire method is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

The one or more hardware processors 402 can also be configured or programmed to cause other devices to perform one or more operations as discussed above. In other words, the one or more hardware processors 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method. In one example, instructions and data for the present module or process 405 for determining a life cycle of a performance of a task flow for a telecommunication service order (e.g., a software program comprising computer-executable instructions) can be loaded into memory 404 and executed by hardware processor element 402 to implement the steps, functions or operations as discussed above in connection with the illustrative method 300. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for determining a life cycle of a performance of a task flow for a telecommunication service order (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method, comprising:
determining, by a processor, a life cycle of a first performance of a task flow for a telecommunication service order, wherein the task flow comprises a plurality of tasks to be followed by at least one human agent associated with a telecommunication service provider in order to complete the telecommunication service order, wherein the life cycle of the first performance of the task flow comprises a duration of time to complete the first performance of the task flow, a duration of time to complete each of the plurality of tasks in the task flow, and an identity of a human agent of the at least one human agent performing each of the plurality of tasks in the task flow;

determining, by the processor, a performance of a first task of the plurality of tasks within the first performance of the task flow has exceeded a threshold processing time duration to complete the first task, wherein a first duration of time for a completion of the performance of the first task is determined based upon a duration of time that a first application screen associated with the first task is active on a device of a first human agent of the at least one human agent performing the first task;

determining, by the processor, that there is a problem with a first centralized system component in response to the determining the performance of the first task within the first performance of the task flow has exceeded the threshold processing time duration; and Identifying, by the processor, the first centralized system component for servicing in response to the determining the problem with the first centralized system component.

2. The method of claim 1, wherein the determining the life cycle of the first performance of the task flow comprises:
determining a duration of time to complete the first performance of the task flow, wherein the determining the duration of time to complete the first performance of the task flow is based upon the first duration of time for the completion of the performance of the first task.

3. The method of claim 2, wherein the first duration of time for the completion of the performance of the first task is further determined based upon data received from the first centralized system component.

4. The method of claim 2, wherein the determining the life cycle of the first performance of the task flow further comprises:
determining a second duration of time for a completion of a second task of the plurality of tasks within the first performance of the task flow, wherein the second duration of time for the completion of the performance of the second task is determined based upon data received from a device of a second human agent of the at least one human agent, wherein the determining the duration of time to complete the first performance of the task flow is based upon the first duration of time for the completion of the performance of the first task and is further based upon the second duration of time for the completion of the performance of the second task.

5. The method of claim 4, wherein the performance of the first task is performed by the first human agent, wherein the performance of the second task is performed by the second human agent.

6. The method of claim 2, wherein data received from the device of the first human agent used in determining the first duration of time for the completion of the performance of the first task comprises a first time stamp indicating a time of an invocation of a first application and an identification of the first application.

7. The method of claim 6, wherein the determining the first duration of time for the completion of the performance of the first task is further based upon data received from the first centralized system component, wherein the determining the first duration of time for the completion of the performance of the first task further comprises correlating the first time stamp indicating the time of the invocation of the first application and the identification of the first application with an access of the first centralized system component.

8. The method of claim 1, wherein the first application screen is determined to be associated with the performance of the first task based upon a tracking of a progress through the first performance of the task flow to a current task of the plurality of tasks of the task flow, wherein a first application associated with the first application screen is anticipated to be invoked based upon the current task of the task flow.

9. The method of claim 1, further comprising:
determining a number of performances of the task flow for which a time to complete the first task has exceeded the threshold processing time duration.

10. The method of claim 9, further comprising:
reporting the first task as being subject to revision when the number of performances of the task flow for which the time to complete the first task has exceeded the threshold processing time duration exceeds a threshold number of performances.

11. The method of claim 9, further comprising:
identifying a problem with a performance of the first human agent of the at least one human agent when the number of performances of the task flow for which the time to complete the first task has exceeded the threshold processing time duration is less than a threshold number of performances, wherein the performance of the first task within the first performance of the task flow is performed by the first human agent.

12. The method of claim 11, wherein the problem with the first human agent comprises a need for training.

13. The method of claim 11, wherein the problem with the first human agent comprises an improper staffing level.

14. The method of claim 1, wherein the telecommunication service order is of a first telecommunication service order type of a plurality of telecommunication service order types, where each of the plurality of telecommunication service order types is associated with a different one of a plurality of task flows, the plurality of task flows comprising the task flow.

15. The method of claim 1, wherein the first centralized system component is implemented on a network-based server.

16. A non-transitory computer-readable storage medium storing instructions which, when executed by a processor, cause the processor to perform operations, the operations comprising:
determining a life cycle of a first performance of a task flow for a telecommunication service order, wherein the task flow comprises a plurality of tasks to be followed by at least one human agent associated with a telecommunication service provider in order to complete the telecommunication service order, wherein the life cycle of the first performance of the task flow comprises a duration of time to complete the first performance of the task flow, a duration of time to complete each of the plurality of tasks in the task flow, and an identity of a human agent of the at least one human agent performing each of the plurality of tasks in the task flow;
determining a performance of a first task of the plurality of tasks within the first performance of the task flow has exceeded a threshold processing time duration to complete the first task, wherein a first duration of time for a completion of the performance of the first task is determined based upon a duration of time that a first application screen associated with the first task is active on a device of a first human agent of the at least one human agent performing the first task;
determining that there is a problem with a first centralized system component in response to the determining the performance of the first task within the first performance of the task flow has exceeded the threshold processing time duration; and identifying the first centralized system component for servicing in response to the determining the problem with the first centralized system component.

17. The non-transitory computer-readable storage medium of claim 16, wherein the determining the life cycle of the first performance of the task flow comprises:
determining a duration of time to complete the first performance of the task flow, wherein the determining the duration of time to complete the first performance of the task flow is based upon the first duration of time for the completion of the performance of the first task.

18. The non-transitory computer-readable storage medium of claim 17, wherein the first duration of time for the completion of the performance of the first task is further determined based upon data received from the first centralized system component.

19. The non-transitory computer-readable storage medium of claim 17, wherein the determining the life cycle of the first performance of the task flow further comprises:
determining a second duration of time for a completion of a second task of the plurality of tasks within the first performance of the task flow, wherein the second duration of time for the completion of the performance of the second task is determined based upon data received from a device of a second human agent of the at least one human agent, wherein the determining the duration of time to complete the first performance of the task flow is based upon the first duration of time for the completion of the performance of the first task and is further based upon the second duration of time for the completion of the performance of the second task.

20. A device, comprising:
a processor; and
a computer-readable storage medium storing instructions which, when executed by the processor, cause the processor to perform operations, the operations comprising:
determining a life cycle of a first performance of a task flow for a telecommunication service order, wherein the task flow comprises a plurality of tasks to be followed by at least one human agent associated with a telecommunication service provider in order to complete the telecommunication service order, wherein the life cycle of the first performance of the task flow comprises a duration of time to complete the first performance of the task flow, a duration of time to complete each of the plurality of tasks in the task flow, and an identity of a human agent of the at least one human agent performing each of the plurality of tasks in the task flow;
determining a performance of a first task of the plurality of tasks within the first performance of the task flow has exceeded a threshold processing time duration to complete the first task, wherein a first duration of time for a completion of the performance of the first task is determined based upon a duration of time that a first application screen associated with the first task is active on a device of a first human agent of the at least one human agent performing the first task;
determining that there is a problem with a first centralized system component in response to the determining the performance of the first task within the first performance of the task flow has exceeded the threshold processing time duration; and identifying the first centralized system component for servicing in response to the determining the problem with the first centralized system component.

* * * * *